US012628183B2

(12) United States Patent
Lei et al.

(10) Patent No.: US 12,628,183 B2
(45) Date of Patent: May 12, 2026

(54) METHOD AND APPARATUS FOR MULTIPLE SIDELINK TRANSMISSION OPPORTUNITIES IN ONE SLOT

(71) Applicant: Lenovo (Beijing) Limited, Beijing (CN)

(72) Inventors: Haipeng Lei, Haidian District (CN); Haiming Wang, Xicheng District (CN); Xiaodong Yu, Haidian District (CN); Zhennian Sun, Chaoyang District (CN)

(73) Assignee: Lenovo (Beijing) Limited, Beijing (CN)

( * ) Notice: Subject to any disclaimer, the term of this patent is extended or adjusted under 35 U.S.C. 154(b) by 566 days.

(21) Appl. No.: 18/020,023

(22) PCT Filed: Aug. 21, 2020

(86) PCT No.: PCT/CN2020/110559
§ 371 (c)(1),
(2) Date: Feb. 6, 2023

(87) PCT Pub. No.: WO2022/036703
PCT Pub. Date: Feb. 24, 2022

(65) Prior Publication Data
US 2023/0292345 A1     Sep. 14, 2023

(51) Int. Cl.
*H04W 72/25*     (2023.01)
*H04L 1/1812*     (2023.01)
(52) U.S. Cl.
CPC .......... *H04W 72/25* (2023.01); *H04L 1/1812* (2013.01)
(58) Field of Classification Search
CPC ............. H04W 72/25; H04W 72/0446; H04W
74/0833; H04W 24/08; H04W 72/1263;
H04W 72/02; H04L 1/1812; H04L
1/1614; H04L 1/1819; H04L 1/1887;
H04L 5/0094; H04L 5/0037; H04L
5/0078; H04L 5/0044; H04L 5/0055;
H04L 5/0053
See application file for complete search history.

(56) References Cited

U.S. PATENT DOCUMENTS 10,009,892 B2    6/2018    Cheng et al.
10,028,151 B2    7/2018    Chandrasekhar et al.
(Continued)

FOREIGN PATENT DOCUMENTS

CN         109151833 A      1/2019
CN         110447287 A      11/2019
(Continued)

OTHER PUBLICATIONS 2023-513122 , "Foreign Office Action", JP Application No. 2023-513122, Oct. 15, 2024, 6 pages.
(Continued)

*Primary Examiner* — Thai Nguyen
(74) *Attorney, Agent, or Firm* — FIG. 1 Patents

(57) ABSTRACT

Embodiments of the present disclosure relate to methods and apparatuses for sidelink transmissions on an unlicensed spectrum. According to some embodiments of the disclosure, a method may include: determining a set of candidate starting positions for sidelink transmission; and performing a first channel access procedure for a first candidate starting position of the set of candidate starting positions in a first slot.

20 Claims, 12 Drawing Sheets

(56)                    References Cited

U.S. PATENT DOCUMENTS

| | | | |
|---|---|---|---|
| 2020/0029318 A1 | 1/2020 | Guo | |
| 2020/0029340 A1* | 1/2020 | He | H04W 72/044 |
| 2020/0099479 A1* | 3/2020 | Park | H04W 4/70 |
| 2020/0187249 A1 | 6/2020 | Yang et al. | |
| 2020/0359375 A1* | 11/2020 | Hwang | H04L 5/0055 |
| 2021/0007081 A1* | 1/2021 | Shin | H04L 1/1887 |
| 2022/0191862 A1* | 6/2022 | Hwang | H04W 72/0446 |

FOREIGN PATENT DOCUMENTS

| | | | | |
|---|---|---|---|---|
| CN | 113543327 A | * | 10/2021 | H04W 72/23 |
| EP | 3806577 A1 | | 4/2021 | |
| JP | 2022517921 A | | 3/2022 | |
| KR | 20180135867 A | | 12/2018 | |
| WO | 2020006955 A1 | | 1/2020 | |
| WO | 2020144261 A1 | | 7/2020 | |
| WO | 2021195960 A1 | | 10/2021 | |

OTHER PUBLICATIONS

Intel Corporation , "Sidelink Resource Allocation Mechanisms for NR V2X Communication", 3GPP TSG RAN WG1 Meeting #94bis, R1-1810775, Chengdu, China, Oct. 2018, 15 pages.

Huawei , et al., "Discussion on usage of mini-slot in unlicensed band below 6GHz", 3GPP TSG RAN WG1 NR AdHoc Meeting, R1-1700420, Spokane, USA [retrieved Feb. 19, 2023]. Retrieved from the Internet <https://www.3gpp.org/ftp/tsg_ran/WG1_RL1/TSGR1_AH/NR_AH_1701/Docs/>., Jan. 2017, 5 Pages.

PCT/CN2020/110559 , "International Preliminary Report on Patentability", PCT Application No. PCT/CN2020/110559, Mar. 2, 2023, 5 pages.

PCT/CN2020/110559 , "International Search Report and Written Opinion", PCT Application No. PCT/CN2020/110559, May 10, 2021, 6 pages.

"Foreign Notice of Allowance", JP Application No. 2023-513122, Apr. 1, 2025, 6 pages.

Intel Corporation, "Sidelink Resource Allocation Mechanisms for NR V2X Communication", 3GPP TSG RAN WG1 Meeting #94bis, Chengdu China, Oct. 8-12, 2012, Oct. 2018, 16 pages.

20949911.0 , "Extended European Search Report", EP Application No. 20949911.0, Apr. 10, 2024, 11 pages.

Ericsson , "Resource allocation procedures 1-15 for Mode 2", 3GPP Draft; RI-1901214 Ericsson—Resource Allocation Procedures for Mode 2, (3GPP), vol. RAN WGI, Retrieved from the Internet: <URL: http://www.3gpp.org/ftp/tsg%5Fran/WG1%5FRL1/TSGR1%5FAH/NR%5FAH%5F1901/Docs/R1%2D1901214%2Ezip>, Jan. 11, 2019, 13 pages.

Foreign Office Action issued in KR 2023-7005594, mailed Dec. 18, 2025, 18 pages.

* cited by examiner

200

300

400

500

1000

1010 1020

1100 determining a set of candidate
starting positions for sidelink
transmission ⌐ 1111 performing a channel access
procedure ⌐ 1113

METHOD AND APPARATUS FOR MULTIPLE SIDELINK TRANSMISSION OPPORTUNITIES IN ONE SLOT

TECHNICAL FIELD

Embodiments of the present disclosure generally relate to wireless communication technology, and more particularly to sidelink transmissions on an unlicensed spectrum.

BACKGROUND

In a wireless communication system, a user equipment (UE), e.g., mobile device, may communicate with another UE via a data path supported by an operator's network, e.g., a cellular or a Wi-Fi network infrastructure. The data path supported by the operator's network may include a base station (BS) and multiple gateways.

In the case that the UEs are relatively close to each other, a radio link or a sidelink can be established between both UEs to provide Device-to-Device (D2D) communication and without going through a direct link to the BS. The term "sidelink" or "SL" may refer to a direct radio link established for communicating among devices, e.g., UEs, as opposed to communicating via the cellular infrastructure (uplink and downlink) as discussed above. In this case, the "sidelink" is also referred to as a D2D or sidelink communication link. The sidelink communication link may be used in any suitable telecommunication network in accordance with various standards, where the telecommunication network may configure a resource pool to be used by the UEs during such sidelink communication.

D2D communication has evolved into vehicle-to-everything (V2X) communication in the Long Term Evolution (LTE) sidelink standard. The V2X communication technology encompasses communication involving vehicles as message sources or destinations. In a new radio (NR) communication system, a transmitting (Tx) UE may send a sidelink transmission to a specific receiving (Rx) UE in a unicast mode, to a group of Rx UEs in a groupcast mode, or to Rx UEs within a range in a broadcast mode.

A UE may operate in both a licensed spectrum and an unlicensed spectrum. For a transmission on an unlicensed spectrum, in order to achieve fair coexistence between wireless systems, a channel access procedure (e.g., a listen-before-talk (LBT) procedure) may be required before transmission on the unlicensed spectrum. In the LBT procedure, a UE may perform energy detection on a certain channel. If the detected energy is lower than a predefined threshold, the channel is deemed as empty and available for transmission, and then the LBT procedure is successful. Only when the LBT procedure is successful can the UE start transmission on the channel and occupy the channel a certain channel occupancy time (COT), which is less than a maximum channel occupancy time (MCOT). Otherwise, the UE cannot start the transmission and may continue to perform another LBT procedure until a successful LBT procedure. Sidelink transmission may also be performed on an unlicensed spectrum.

There is a need for handling sidelink transmissions on an unlicensed spectrum. For example, solutions that can improve the utilization of radio resources with relatively simple implementation so as to enhance the sidelink transmission on the unlicensed spectrum are desired.

SUMMARY

Some embodiments of the present disclosure provide a method. The method may include: determining a set of candidate starting positions for sidelink transmission; and performing a first channel access procedure for a first candidate starting position of the set of candidate starting positions in a first slot.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, to cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
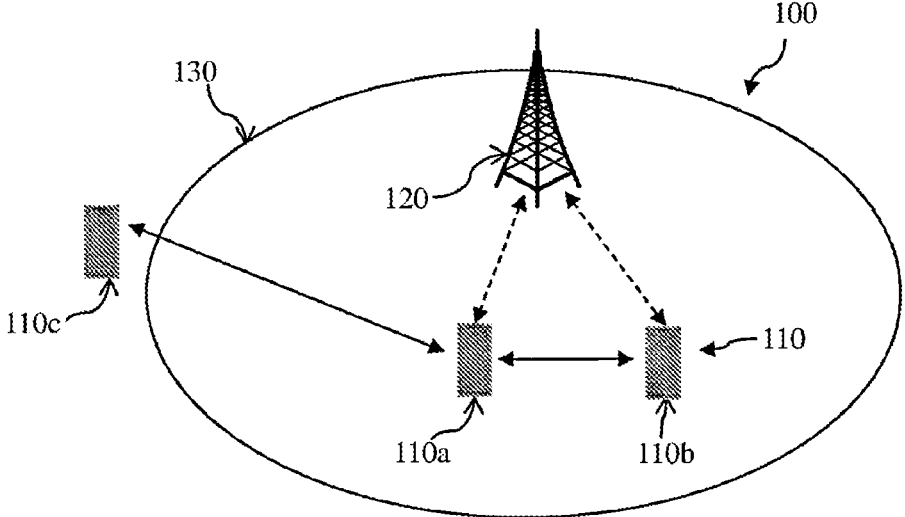
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include a base station (e.g., BS 120) and some UEs 110 (e.g., UE 110a, UE 110b, and UE 110c). Although a specific number of UEs 110 and one BS 120 are depicted in FIG. 1, it is contemplated that wireless communication system 100 may also include more BSs and more or fewer UEs in and outside of the coverage of the BSs.

The UEs and the BS may support communication based on, for example, 3G, long-term evolution (LTE), LTE-advanced (LTE-A), new radio (NR), or other suitable protocol(s). In some embodiments of the present disclosure, the BS 102 may be referred to as an access point, an access terminal, a base, a base unit, a macro cell, a Node-B, an evolved Node B (eNB), a gNB, a Home Node-B, a relay node, or a device, or described using other terminology used in the art. The UE 110a, UE 110b, or UE 110c may include, for example, but is not limited to, a computing device, a wearable device, a mobile device, an IoT device, a vehicle, etc. Persons skilled in the art should understand that as technology develops and advances, the terminologies described in the present disclosure may change, but should not affect or limit the principles and spirit of the present disclosure.

The BS 120 may define one or more cells, and each cell may have a coverage area 130. In the exemplary wireless communication system 100, some UEs (e.g., UE 110a and UE 110b) are within the coverage of the BS 120, which may not be a specific base station 120 shown in FIG. 1 and can be any one of the base stations 120 in a wireless communication system, and some UEs (e.g., UE 110c) are outside of the coverage of the BS 120. For example, in the case that the wireless communication system includes two base stations 120 with UE 110a being within the coverage of any one of the two base stations 120 means that UE 110a is within the coverage of a base station 120 (i.e., in-coverage) in the wireless communication system; and UE 110a being outside of the coverage of both base stations 120 means that UE 110a is outside the coverage of a base station 120 (i.e., out-of-coverage) in the wireless communication system.

Still referring to FIG. 1, the UE 110a and UE 110b may communicate with the BS 120 via, for example, a Uu link (denoted by dotted arrow in FIG. 1). The UE 110a, UE 110b, and UE 110c may communicate with each other via a sidelink (denoted by solid arrow in FIG. 1), and may form a UE group. There may be two resource allocation modes for sidelink transmission. One of the two resource allocation modes is based on the scheduling of a base station, and may be referred to as mode 1; and the other is based on the autonomous selection of the UE, and may be referred to as mode 2.

In both mode 1 and mode 2, the sidelink transmission may involve a physical sidelink control channel (PSCCH) and an associated physical sidelink shared channel (PSSCH), which is scheduled by the sidelink control information (SCI) carried on the PSCCH. The SCI and associated PSSCH may be transmitted from a transmitting UE (hereinafter referred to as "Tx UE") to a receiving UE (hereinafter referred to as "Rx UE") in a unicast manner, to a group of Rx UEs in a groupcast manner, or to Rx UEs within a range in a broadcast manner. For example, referring to FIG. 1, UE 110a (acting as a Tx UE) may transmit data to UE 110b or UE 110c (acting as an Rx UE).

In mode 1, resources may be assigned by a base station via dynamic scheduling or configured grant(s). In mode 2, a UE may need to perform resource sensing by monitoring and decoding all SCI transmitted in an SCI resource pool to obtain resource reservation information. By doing so, the UE may identify candidate resources that are available for communication. The UE may then, for example, randomly select required resources from the identified candidate resources.

BSs (e.g., BS 120 in FIG. 1) and UEs (e.g., UE 110a, UE 110b, and UE 110c in FIG. 1) may operate in both a licensed spectrum and an unlicensed spectrum. For example, the unlicensed spectrum may be at around 6 GHz or 60 GHz of a carrier frequency. For a transmission on an unlicensed spectrum, in order to achieve fair coexistence between wireless systems (e.g., NR system access on unlicensed spectrum (NR-U) systems and other wireless systems such as Wi-Fi systems), a channel access procedure, also known as a listen-before-talk (LBT) test or LBT procedure, may be performed before communicating on the unlicensed spectrum.

The channel access procedure may be performed based on sensing (or energy detection) that evaluates the availability of a channel for performing transmissions. The basic unit for sensing is a sensing slot. In some examples, the sensing slot may have the duration of $T_{sl}=9$us. When a BS or UE senses a channel during a sensing slot duration $T_{sl}$, and determines that the detected energy for at least a certain period of time (e.g., 4us) within the sensing slot duration is less than an energy detection threshold ($X_{thresis}$), the sensing slot duration $T_{sl}$ may be considered as idle and so the channel may be deemed as empty or clear or available in the sensing slot. Otherwise, the sensing slot duration T may be considered as busy, and so the channel may be deemed as occupied or non-available in the sensing slot.

In NR-U systems, when a BS or UE intends to initiate a channel occupancy time (COT) for DL or UL transmission, a Type 1 DL or UL channel access procedure, also known as "LBT Category 4 procedure" or "LBT Cat. 4 procedure," may be performed. In response to a successful Type 1 DL or UL channel access procedure, the BS or UE can start a transmission on the channel and occupy the channel up to a maximum channel occupancy time (MCOT). Otherwise, the BS or UE cannot start the transmission and may continue to perform another LBT procedure until a successful LBT procedure. The duration of a MCOT may be dependent on a corresponding channel access priority class (CAPC) value and the existence of other technologies (e.g., WiFi) sharing the same unlicensed spectrum with the NR-U systems. The more detailed Type 1 channel access procedure is specified in 3GPP standard specification TS 37.213.

A channel occupancy (CO) refers to a transmission(s) on a channel(s) by a BS or UE after performing a corresponding channel access procedure(s). A channel occupancy time (COT) may refer to the total time for which a specific BS or UE and any other BS(s) or UE(s) sharing the channel occupancy perform transmission(s) on the channel after the specific BS or UE performs a corresponding channel access procedure. A channel occupancy time can be shared for transmission between a BS and a UE(s) or between UEs.

When an unlicensed spectrum is used for sidelink transmissions, for the purpose of fair coexistence, the channel access procedure is still required before any sidelink transmission. Due to the unpredictability of a channel access procedure, a UE cannot determine when the channel is available for sidelink transmissions, which may be problematic. For example, assuming that a UE prepares a PSCCH and an associated PSSCH (hereinafter referred to as "PSCCH/PSSCH") from symbol 0, when the UE performs a successful channel access procedure and obtains a channel from symbol 7 of a certain slot (e.g., slot n), the UE may have to wait or transmit some reservation signal and start transmitting the prepared PSCCH/PSSCH from symbol 0 of the next slot (e.g., slot n+1). In this scenario, one half of a slot (e.g., symbol 7 to symbol 13 of slot n) is wasted.

In another scenario, when a UE is assigned a slot within a COT initiated by a BS or another UE, for example, the assigned resource is started from symbol 0 of a certain slot (e.g., slot n), the UE may prepare a PSCCH and an associated PSSCH from symbol 0. However, when the UE fails to perform a successful channel access procedure before symbol 0 of slot n, the UE cannot transmit the prepared PSCCH/PSSCH in the slot. The UE thus loses the transmission opportunity and has to wait for the next resource assignment.

To improve the utilization of radio resources and increase transmission opportunities, in some embodiments of the present disclosure, before performing a channel access procedure, a UE may prepare a plurality of PSCCHs/PSSCHs corresponding to a plurality of candidate starting positions in a slot. For example, the UE may prepare a first PSCCH/PSSCH started from symbol 0, a second PSCCH/PSSCH started from symbol 4 and a third PSCCH/PSSCH started from symbol 8. According to the results of the channel access procedure, the UE may select one of the plurality of prepared PSCCHs/PSSCHs. For example, the UE may select a specific PSCCH/PSSCH from the plurality of prepared PSCCHs/PSSCHs which is prepared with a starting position aligned with the current candidate starting position with successful channel access procedure; or the UE may select the specific PSCCH/PSSCH which is prepared with a starting position nearest to the next candidate starting position. The UE may then transmit the selected PSCCH/PSSCH started from the current candidate starting position or the next nearest candidate starting position.

In the following text, enhanced solutions that can reduce the implementation complexity while providing a plurality of transmission opportunities for a sidelink transmission(s) on an unlicensed spectrum are provided. More details on the embodiments of the present disclosure will be illustrated in the following text in combination with the appended drawings.

In some embodiments of the present disclosure, for a sidelink transmission(s) over an unlicensed spectrum, all symbols in a slot available for transmitting a PSSCH may be divided into one or more symbol groups for PSSCH transmission. The number of symbol groups may be dependent on the total number of symbols available for transmitting the PSSCH in a slot. Each symbol group of the one or more symbol groups may include the same or different numbers of symbols.

In some embodiments, the first symbol (e.g., symbol 0) of the slot may be used for automatic gain control (AGC) tuning. A PSCCH scheduling the PSSCH may be placed at the beginning of a sidelink transmission following the first symbol for AGC tuning. In the case that a PSCCH and the associated PSSCH are multiplexed based on pure time division multiplexing (TDM), the PSCCH is not included in any of the symbol groups since the symbols for transmitting the PSCCH are not available for transmitting the PSSCH. In the case that a PSCCH and the associated PSSCH are multiplexed based on TDM and frequency division multiplexing (FDM), the symbols for transmitting the PSCCH are included in a symbol group (e.g., the first symbol group of the one or more symbol groups).

In some embodiments of the present disclosure, the structure of the symbol groups in a slot may be configured by radio resource control (RRC) signaling. For example, the number of the symbol groups in a slot, the number of symbols in each symbol group, or both may be configured by RRC signaling. In some embodiments of the present disclosure, the structure of the symbol groups in a slot may be predefined, for example, in standards. In some embodiments of the present disclosure, a set of candidate starting positions for a sidelink transmission(s) in a slot may be determined based on the structure of the symbol groups. In some examples, the number of candidate starting positions in a slot may be equal to the number of symbol groups in a slot. Details regarding how to determine the set of candidate starting positions based on the symbol groups will be described in the following text.

In some embodiments of the present disclosure, the structure of the symbol groups in a slot may be determined based on a set of candidate starting positions. The set of candidate starting positions may be configured by RRC signaling or predefined, for example, in standards. In some examples, the number of candidate starting positions in a slot may be equal to the number of symbol groups in a slot. Details regarding how to determine the symbol groups based on the set of candidate starting positions will be described in the following text.

The following are some principles for determining the symbols available for transmitting a PSSCH. As mentioned above, since the first symbol (e.g., symbol 0) in a slot may be used for AGC tuning, the first symbol may not be counted in the symbols available for transmitting a PSSCH. When the last symbol (e.g., symbol 13) in a slot is left blank for a gap, the last symbol is not counted in the symbols available for transmitting the PSSCH. When the PSCCH and PSSCH are pure time division multiplexed in a slot, that is, there is no overlapping between the PSCCH and PSSCH in the frequency domain, when partitioning the symbol groups, the symbols for the PSCCH transmission are not counted in the symbols available for transmitting the PSSCH.

Demodulation reference signal (DMRS) may be required for decoding a PSSCH. In some embodiments of the present disclosure, each symbol group in a slot may include at least one DMRS symbol. In some embodiments of the present disclosure, at least one of the symbol groups in a slot may not include any DMRS symbol. For example, the first symbol group of the one or more symbol groups in a slot includes a DMRS symbol and the remaining symbol groups of the one or more symbol groups do not include any DMRS symbol. In some other examples, both the first symbol group and the third symbol group include a DMRS symbol and the remaining symbol groups do not include any DMRS symbol.

Figure 2:
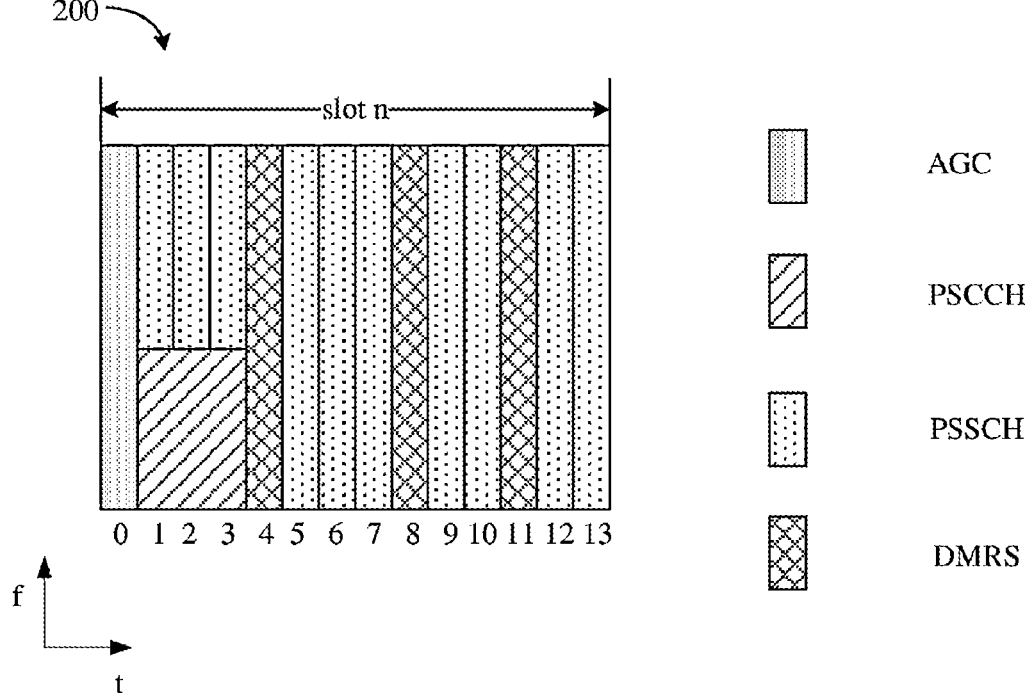
FIG. 2 illustrates an exemplary symbol group configuration in accordance with some embodiments of the present disclosure.

FIG. 2 illustrates an exemplary symbol group configuration 200 in accordance with some embodiments of the present disclosure. Details described in all of the foregoing embodiments of the present disclosure are applicable for the embodiments shown in FIG. 2.

In FIG. 2, a PSCCH and the associated PSSCH are multiplexed in a slot (e.g., slot n) based on TDM and FDM. Slot n may include 14 symbols (e.g., symbols 0-13, marked as 0 to 13 along the time (t) axis in FIG. 2). It is contemplated that a slot may include more or fewer symbols according to the communication standards employed.

Referring to FIG. 2, the first symbol (e.g., symbol 0) in slot n may be used for AGC tuning, and the last symbol (e.g., symbol 13) in slot n is available for transmitting a PSSCH. Therefore, there are 13 symbols available for a PSSCH transmission, which may be divided into one or more symbol groups for the PSSCH transmission. In the exemplary symbol group configuration 200, all the symbols available for the PSSCH transmission are divided into 4 symbol groups (SGs), including SG0, SG1, SG2, and SG3. It should be appreciated by persons skilled in the art that the symbols available for a PSSCH transmission can be divided into more or fewer symbol groups. For example, the symbols available for a PSSCH transmission in a slot may be divided into 2 or 3 symbol groups.

In some examples, SG0 may include symbols 1-4, SG1 may include symbols 5-7, SG2 may include symbols 8-10, and SG3 may include symbols 11-13. It should be appreciated by persons skilled in the art that a symbol group for a PSSCH transmission can include more or fewer symbols. For example, the number of symbols in each group can be 1, 2, 3, 4, 5, 6, or 7.

Figure 3:
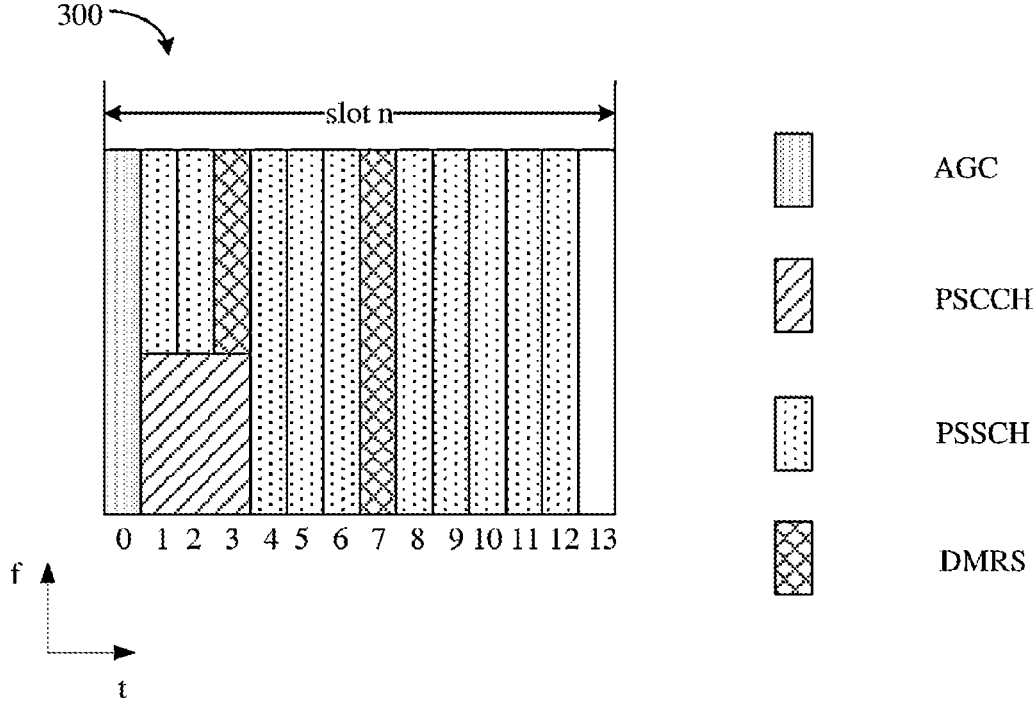
FIG. 3 illustrates an exemplary symbol group configuration in accordance with some embodiments of the present disclosure.

FIG. 3 illustrates an exemplary symbol group configuration 300 in accordance with some embodiments of the present disclosure. Details described in all of the foregoing embodiments of the present disclosure are applicable for the embodiments shown in FIG. 3.

In FIG. 3, a PSCCH and the associated PSSCH are multiplexed in a slot (e.g., slot n) based on TDM and FDM. Slot n may include 14 symbols (e.g., symbols 0-13, marked as 0 to 13 along the time (t) axis in FIG. 3). It is contemplated that a slot may include more or fewer symbols according to the communication standards employed.

Referring to FIG. 3, the first symbol (e.g., symbol 0) in slot n may be used for AGC tuning. The last symbol (e.g., symbol 13) in slot n is left blank as a gap, and therefore is not available for transmitting a PSSCH. As a result, there are 12 symbols available for a PSSCH transmission, which may be divided into one or more symbol groups for the PSSCH transmission. In the exemplary symbol group configuration 300, all the symbols available for the PSSCH transmission are divided into 4 symbol groups (SGs), including SG0, SG1, SG2, and SG3. It should be appreciated by persons skilled in the art that the symbols available for the PSSCH transmission can be divided into more or fewer symbol groups. For example, the symbols available for the PSSCH transmission in a slot may be divided into 2 or 3 symbol groups.

In some examples, each of the 4 symbol groups may have the same number of symbols. That is, SG0 may include symbols 1-3, SG1 may include symbols 4-6, SG2 may include symbols 7-9, and SG3 may include symbols 10-12. It should be appreciated by persons skilled in the art that each symbol group in a slot may be different numbers of symbols, and a symbol group for the PSSCH transmission can include more or fewer symbols. For example, the number of symbols in each group can be 1, 2, 3, 4, 5, 6, or 7.

Figure 4:
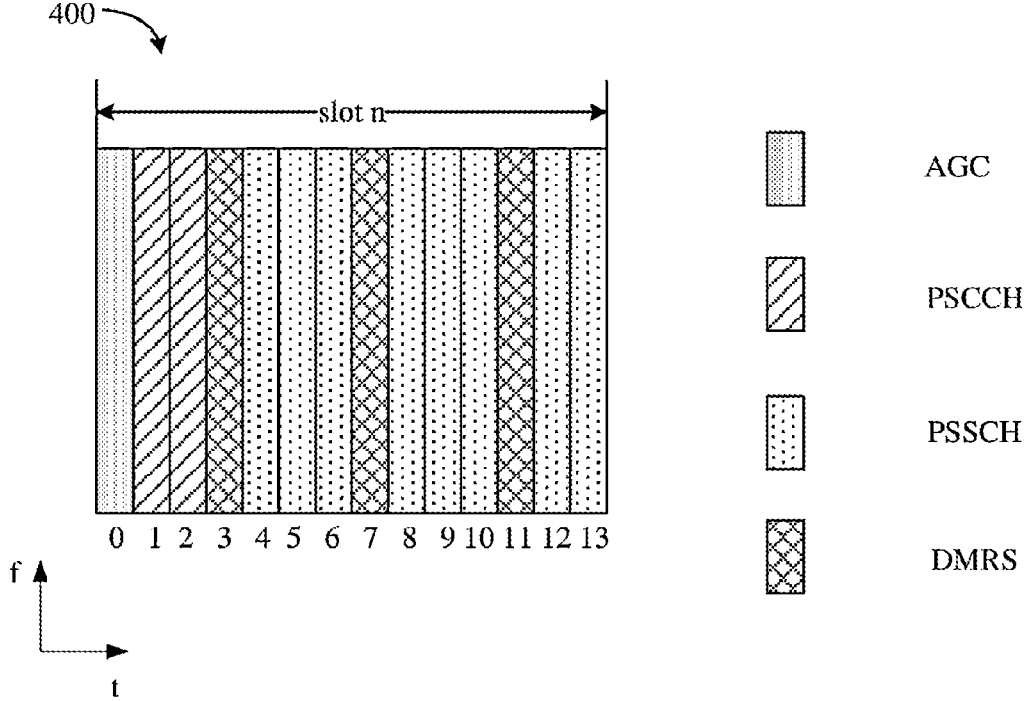
FIG. 4 illustrates an exemplary symbol group configuration in accordance with some embodiments of the present disclosure.

FIG. 4 illustrates an exemplary symbol group configuration 400 in accordance with some embodiments of the present disclosure. Details described in all of the foregoing embodiments of the present disclosure are applicable for the embodiments shown in FIG. 4.

In FIG. 4, a PSCCH and the associated PSSCH are multiplexed in a slot (e.g., slot n) based on pure TDM. Slot n may include 14 symbols (e.g., symbols 0-13, marked as 0 to 13 along the time (t) axis in FIG. 4). It is contemplated that a slot may include more or fewer symbols according to the communication standards employed.

Referring to FIG. 4, the first symbol (e.g., symbol 0) in slot n may be used for AGC tuning, the PSCCH occupies 2 symbols (e.g., symbols 1 and 2) in slot n, and the last symbol (e.g., symbol 13) in slot n is available for transmitting the PSSCH. Therefore, there are 11 symbols available for a PSSCH transmission, which may be divided into one or more symbol groups for the PSSCH transmission. In the exemplary symbol group configuration 400, all the symbols available for the PSSCH transmission are divided into 3 symbol groups (SGs), including SG0, SG1, and SG2. It should be appreciated by persons skilled in the art that the symbols available for a PSSCH transmission can be divided into more or fewer symbol groups. For example, the symbols available for the PSSCH transmission in a slot may be divided into 2 or 4 symbol groups.

In some examples, SG0 may include symbols 3-6, SG1 may include symbols 7-10, and SG2 may include symbols 11-13. It should be appreciated by persons skilled in the art that a symbol group for a PSSCH transmission can include more or fewer symbols. For example, the number of symbols in each group can be 1, 2, 3, 4, 5, 6, or 7.

Figure 5:
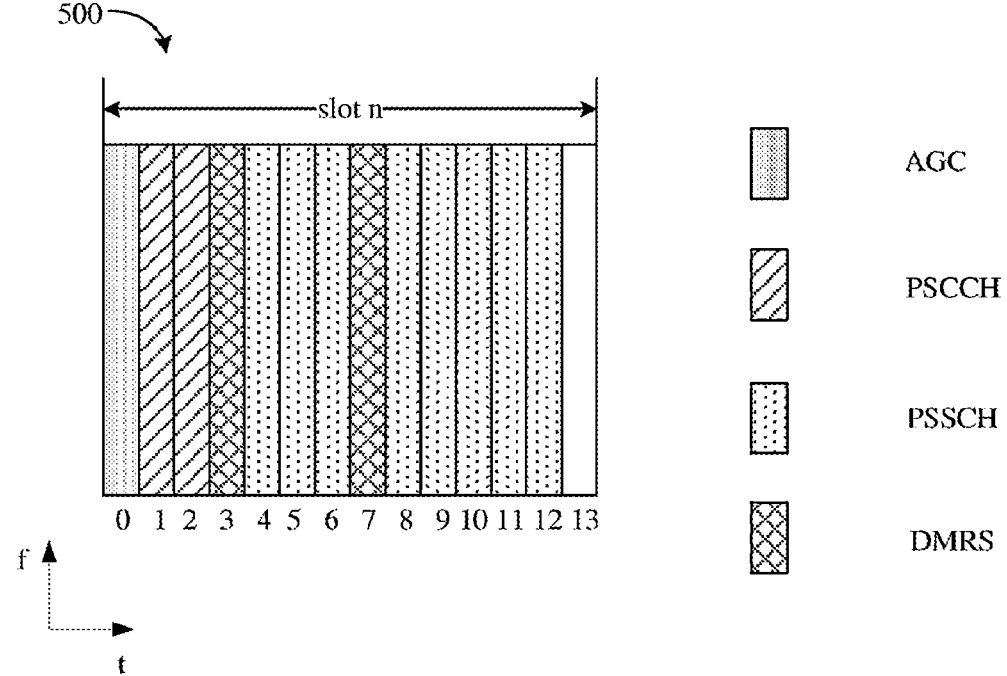
FIG. 5 illustrates an exemplary symbol group configuration in accordance with some embodiments of the present disclosure.

FIG. 5 illustrates an exemplary symbol group configuration 500 in accordance with some embodiments of the present disclosure. Details described in all of the foregoing embodiments of the present disclosure are applicable for the embodiments shown in FIG. 5.

In FIG. 5, a PSCCH and the associated PSSCH are multiplexed in a slot (e.g., slot n) based on TDM. Slot n may include 14 symbols (e.g., symbols 0-13, marked as 0 to 13 along the time (t) axis in FIG. 5). It is contemplated that a slot may include more or fewer symbols according to the communication standards employed.

Referring to FIG. 5, the first symbol (e.g., symbol 0) in slot n may be used for AGC tuning, and the PSCCH occupies 2 symbols (e.g., symbols 1 and 2) in slot n. The last symbol (e.g., symbol 13) in slot n is left blank as a gap, and thus is not available for transmitting a PSSCH. Therefore, there are 10 symbols available for a PSSCH transmission, which may be divided into one or more symbol groups for the PSSCH transmission. In the exemplary symbol group configuration 500, all the symbols available for the PSSCH transmission are divided into 3 symbol groups (SGs), including SG0, SG1, and SG2. It should be appreciated by persons skilled in the art that the symbols available for a PSSCH transmission can be divided into more or fewer symbol groups. For example, the symbols available for the PSSCH transmission in a slot may be divided into 2 or 4 symbol groups.

In some examples, SG0 may include symbols 3-6, SG1 may include symbols 7-9, and SG2 may include symbols 10-12. It should be appreciated by persons skilled in the art that a symbol group for a PSSCH transmission can include more or fewer symbols. For example, the number of symbols in each group can be 1, 2, 3, 4, 5, 6, or 7.

It should be understood that the symbol group configurations as shown above are only for illustrative purposes, and should not be construed as limits to the embodiments of the present disclosure. For example, although in FIGS. 2-5, the DMRS is transmitted in certain symbols in a slot, it is contemplated that the DMRS may be transmitted in more or fewer symbols in a slot. Although the PSCCH is transmitted in symbols 1-3 in FIGS. 2 and 3, and occupies 2 symbols (e.g., symbols 1 and 2) in FIGS. 4 and 5, the PSCCH may be transmitted in or occupy more or fewer symbols in a slot.

In order to provide a plurality of transmission opportunities for a sidelink transmission in a slot, a set of candidate starting positions for the sidelink transmission in the slot may be configured by RRC signaling, predefined, or implicitly determined based on the structure of the symbol groups. In a slot, a channel access procedure (e.g., LBT procedure) may be performed before the first candidate starting position of the set of candidate starting positions. When the channel access procedure succeeds, the sidelink transmission may start from the first candidate starting position in the slot. When the channel access procedure fails, another channel access procedure may be performed before the next (e.g., the second) candidate starting position of the set of candidate starting positions, until a channel access procedure succeeds at one of the set of candidate starting positions. If channel access procedures for all the candidate starting positions in the slot fail, the channel access procedure may be performed in the next slot in a similar manner. For example, a channel access procedure may be performed before the first candidate starting position of the next slot.

In some embodiments of the present disclosure, the set of candidate starting positions may be {0, 3, 6, 9}, which includes candidate starting positions at symbols 0, 3, 6, and 9. In some embodiments of the present disclosure, the set of candidate starting positions may be {0, 4, 7} or {0, 3, 7} or {0, 7}. It is contemplated that the set of candidate starting positions may include other possible symbol indices. As a principle, both the Tx UE and Rx UE should maintain the same set of candidate starting positions such that the Rx UE would know the possible starting position for receiving a sidelink transmission. For example, the same set of candidate starting positions may be configured by RRC signaling or predefined. In another example, the Tx UE and Rx UE may follow the same rule to determine a set of candidate starting positions based on the same structure of symbol groups, which is configured for both the Tx UE and Rx UE by RRC signaling or predefinition.

From the perspective of a Tx UE, a single PSCCH/PSSCH may be prepared for a slot before performing a channel access procedure. The PSCCH/PSSCH may be transmitted at a position based on the outcome of the channel access procedure. For example, the UE may transmit the prepared PSCCH/PSSCH from a candidate starting position with a successful channel access procedure to the last available symbol in the slot (e.g., symbol 12 if symbol 13 is left blank as shown in FIGS. 3 and 5, or symbol 13 if symbol 13 is available for sidelink transmission). Based on the outcome of the channel access procedure, the prepared symbols for PSCCH/PSSCH are transmitted from the left to the right (i.e., from the lowest symbol index to a higher symbol index) on the available symbols in the slot. The prepared symbol(s) after the last available symbol, if any, is punctured.

For example, assuming that N symbols including the first symbol for AGC tuning are prepared for a PSCCH/PSSCH in a slot, when a channel access procedure for a candidate starting position (e.g., symbol x) succeeds, it can be determined that there are (14−x−y) symbols available for the PSCCH/PSSCH transmission, wherein 14 is the number of symbols in a slot, y=1 when the last symbol (symbol 13) in the slot is left as a gap, and y=0 when the last symbol in the slot is available for transmission. In this case, the first (14−x−y) symbols of the N prepared symbols can be transmitted on the practical symbols from symbol x to symbol 13-$y$ and the last (N−14+x+y) symbols of the N prepared symbols are punctured.

To put it another way, when the number of symbols prepared for a PSCCH/PSSCH is larger than the number of symbols practically available for transmission in a slot, for example, when the PSCCH/PSSCH is prepared with 14 symbols and practical transmission is not started from symbol 0, the prepared PSCCH/PSSCH is punctured from the right to the left (i.e., from the highest symbol index to a lower symbol index). In this way, the PSCCH which is placed at the beginning of each sidelink transmission can be transmitted instead of being punctured.

Figure 6:
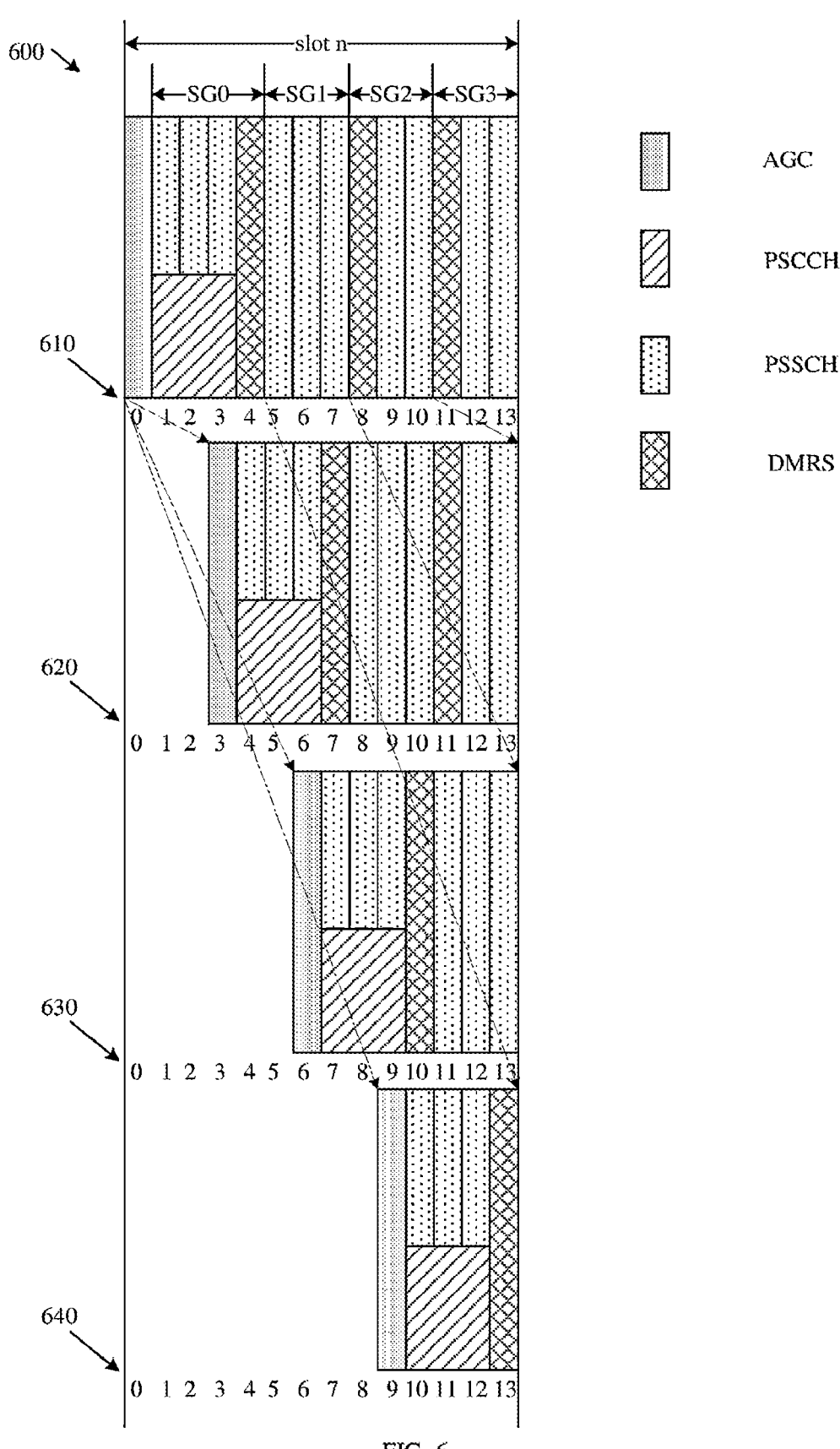
FIG. 6 illustrates an exemplary sidelink transmission in accordance with some embodiments of the present disclosure.

FIG. 6 illustrates an exemplary sidelink transmission 600 in accordance with some embodiments of the present disclosure. Details described in all of the foregoing embodiments of the present disclosure are applicable for the embodiments shown in FIG. 6.

In some embodiments of the present disclosure, the structure of the symbol groups in a slot may be configured or predefined as the one described with respect to FIG. 2. Specifically, referring to FIG. 6, the first symbol group SG0 may include symbols 1-4, the second symbol group SG1 may include symbols 5-7, the third symbol group SG2 may include symbols 8-10, and the fourth symbol group SG3 may include symbols 11-13.

The candidate starting positions may be determined based on the structure of the symbol groups. For example, the number of the candidate starting positions may be equal to the number of symbol groups in a slot. Based on the above symbol group structure, a UE may determine that the set of candidate starting positions is {0, 3, 6, 9}. That is, the first candidate starting position (symbol 0) is determined based on the assumption that all symbol groups can be transmitted, the second candidate starting position (symbol 3) is determined based on the assumption that symbol groups SG0-SG2 can be transmitted, the third candidate starting position (symbol 6) is determined based on the assumption that symbol groups SG0 and SG1 can be transmitted, and the fourth candidate starting position (symbol 9) is determined based on the assumption that symbol group SG0 can be transmitted.

Referring to FIG. 6, including the first symbol for AGC tuning, a UE may prepare a single PSCCH/PSSCH with 14 symbols without the last gap symbol. In the case that a channel access procedure for the first candidate starting position (symbol 0) of slot n succeeds, all 14 prepared symbols are transmitted from symbol 0 to symbol 13 on the practical symbols of the slot, as shown at 610 in FIG. 6. Otherwise, in the case that the channel access procedure for symbol 0 fails, the UE may perform a channel access procedure for the second candidate starting position (symbol 3) of slot n.

In the case that the channel access procedure for symbol 3 succeeds, since there are a total of 11 symbols (from symbol 3 to symbol 13) available in the slot, the first 11 symbols of the 14 prepared symbols are transmitted from symbol 3 to symbol 13 on the practical symbols of the slot, as shown at 620 in FIG. 6. Otherwise, in the case that the channel access procedure for symbol 3 fails, the UE may perform a channel access procedure for the third candidate starting position (symbol 6) of slot n.

In the case that the channel access procedure for symbol 6 succeeds, since there are a total of 8 symbols (from symbol 6 to symbol 13) available in the slot, the first 8 symbols of the 14 prepared symbols are transmitted from symbol 6 to symbol 13 on the practical symbols of the slot, as shown at 630 in FIG. 6. In the case that the channel access procedure for symbol 6 fails, the UE may perform a channel access procedure for the fourth candidate starting position (symbol 9) of slot n.

In the case that the channel access procedure for symbol 9 succeeds, since there are a total of 5 symbols (from symbol 9 to symbol 13) available in the slot, the first 5 symbols of the 14 prepared symbols are transmitted from symbol 9 to symbol 13 on the practical symbols of the slot, as shown at 640 in FIG. 6. In the case that the channel access procedure for symbol 9 fails, the UE may perform a channel access procedure for the first candidate starting position (symbol 0) in the next slot (slot n+1).

Figure 7:
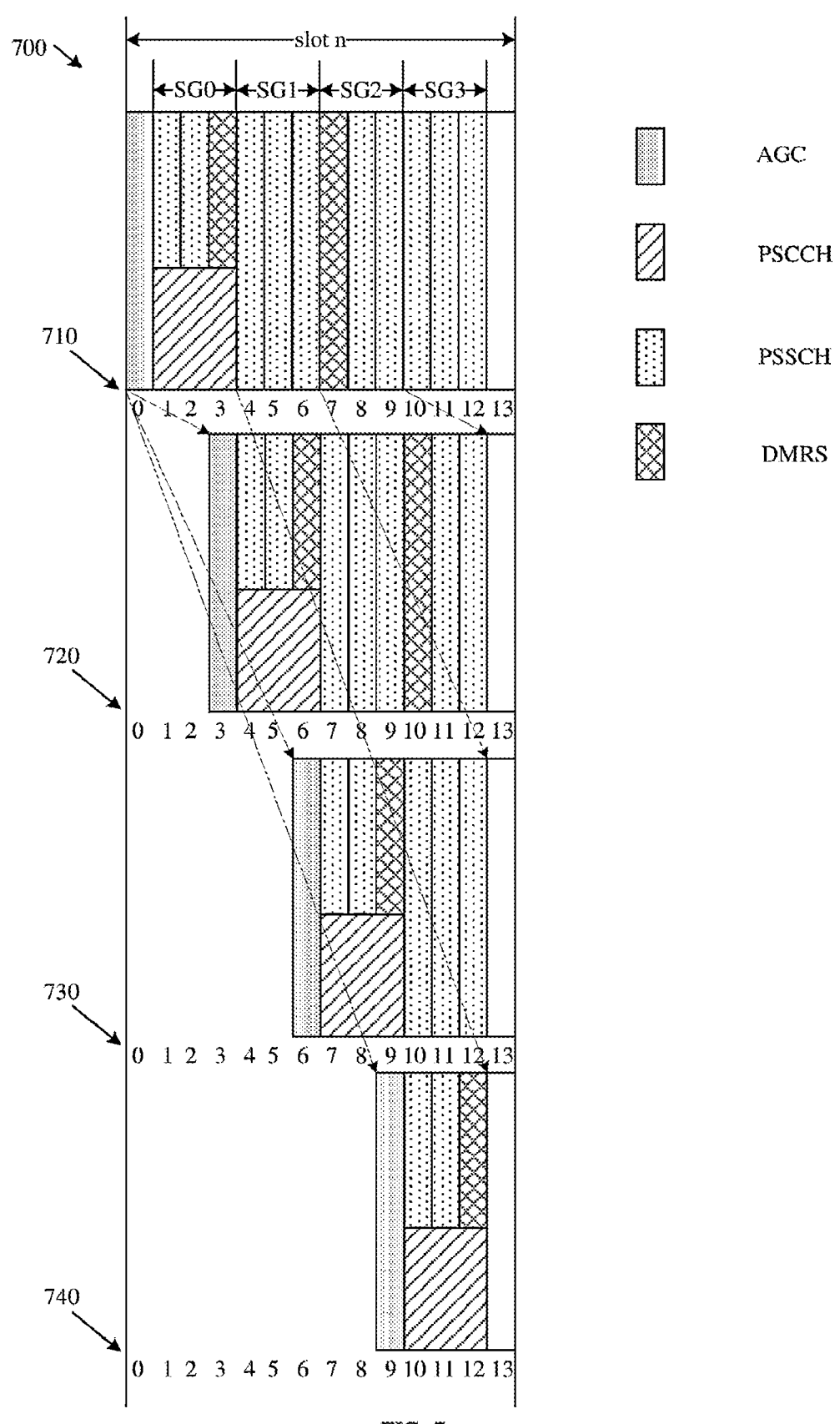
FIG. 7 illustrates an exemplary sidelink transmission in accordance with some embodiments of the present disclosure.

FIG. 7 illustrates an exemplary sidelink transmission 700 in accordance with some embodiments of the present disclosure. Details described in all of the foregoing embodiments of the present disclosure are applicable for the embodiments shown in FIG. 7.

In some embodiments of the present disclosure, the structure of the symbol groups in a slot may be configured or predefined as the one described with respect to FIG. 3. Specifically, referring to FIG. 7, the first symbol group SG0 may include symbols 1-3, the second symbol group SG1 may include symbols 4-6, the third symbol group SG2 may include symbols 7-9, and the fourth symbol group SG3 may include symbols 10-12.

The candidate starting positions may be determined based on the structure of the symbol groups. For example, the number of the candidate starting positions may be equal to the number of symbol groups in a slot. Based on the above symbol group structure, a UE may determine what the set of candidate starting positions is, e.g., a set of candidate starting positions may be {0, 3, 6, 9}. That is, the first candidate starting position (symbol 0) is determined based on the assumption that all symbol groups can be transmitted, the second candidate starting position (symbol 3) is determined based on the assumption that symbol groups SG0-SG2 can be transmitted, the third candidate starting position (symbol 6) is determined based on the assumption that symbol groups SG0 and SG1 can be transmitted, and the fourth candidate starting position (symbol 9) is determined based on the assumption that symbol group SG0 can be transmitted.

Referring to FIG. 7, including the first symbol for AGC tuning, a UE may prepare a single PSCCH/PSSCH with 13 symbols with the last gap symbol (symbol 13). In the case that a channel access procedure for the first candidate starting position (symbol 0) of slot n succeeds, all 13 prepared symbols are transmitted from symbol 0 to symbol 12 on the practical symbols of the slot, as shown at 710 in FIG. 7. Otherwise, in the case that the channel access procedure for symbol 0 fails, the UE may perform a channel access procedure for the second candidate starting position (symbol 3) of slot n.

In the case that the channel access procedure for symbol 3 succeeds, since there are a total of 10 symbols (from symbol 3 to symbol 12) available in the slot, the first 10 symbols of the 13 prepared symbols are transmitted from symbol 3 to symbol 12 on the practical symbols of the slot, as shown at 720 in FIG. 7. Otherwise, in the case that the channel access procedure for symbol 3 fails, the UE may perform a channel access procedure for the third candidate starting position (symbol 6) of slot n.

In the case that the channel access procedure for symbol 6 succeeds, since there are a total of 7 symbols (from symbol 6 to symbol 12) available in the slot, the first 7 symbols of the 13 prepared symbols are transmitted from symbol 6 to symbol 12 on the practical symbols of the slot, as shown at 730 in FIG. 7. In the case that the channel access procedure for symbol 6 fails, the UE may perform a channel access procedure for the fourth candidate starting position (symbol 9) of slot n.

In the case that the channel access procedure for symbol 9 succeeds, since there are a total of 4 symbols (from symbol 9 to symbol 12) available in the slot, the first 4 symbols of the 13 prepared symbols are transmitted from symbol 9 to symbol 12 on the practical symbols of the slot, as shown at 740 in FIG. 7. In the case that the channel access procedure for symbol 9 fails, the UE may perform a channel access procedure for the first candidate starting position (symbol 0) in the next slot (slot n+1).

Figure 8:
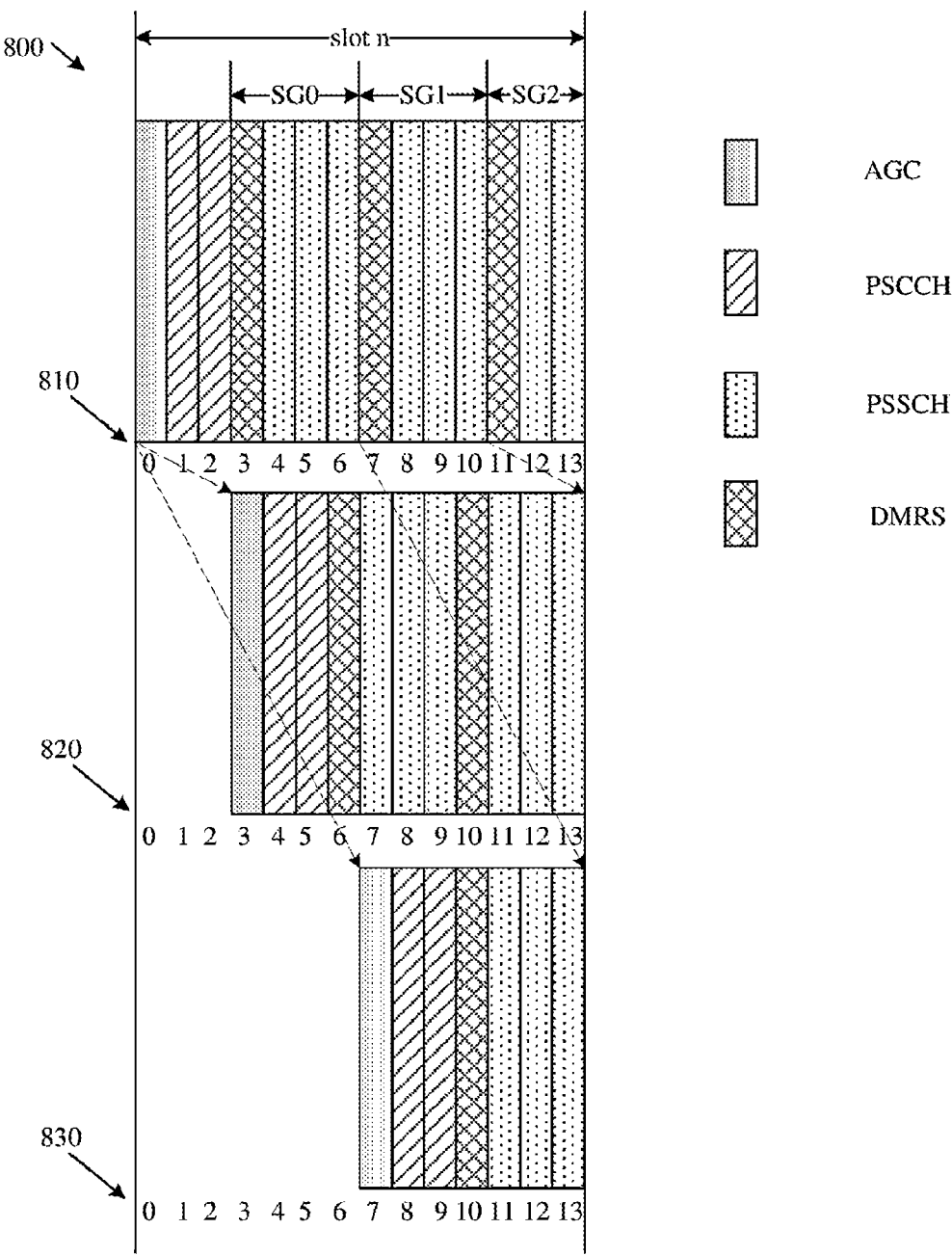
FIG. 8 illustrates an exemplary sidelink transmission in accordance with some embodiments of the present disclosure.

FIG. 8 illustrates an exemplary sidelink transmission 800 in accordance with some embodiments of the present disclosure. Details described in all of the foregoing embodiments of the present disclosure are applicable for the embodiments shown in FIG. 8.

In some embodiments of the present disclosure, the structure of the symbol groups in a slot may be configured or predefined as the one described with respect to FIG. 4. Specifically, referring to FIG. 8, the first symbol group SG0 may include symbols 3-6, the second symbol group SG1 may include symbols 7-10, and the third symbol group SG2 may include symbols 11-13.

The candidate starting positions may be determined based on the structure of the symbol groups. For example, the number of the candidate starting positions may be equal to the number of symbol groups in a slot. Based on the above symbol group structure, a UE may determine that the set of candidate starting positions is {0, 3, 7}. That is, the first candidate starting position (symbol 0) is determined based on the assumption that all symbol groups can be transmitted, the second candidate starting position (symbol 3) is determined based on the assumption that symbol groups SG0 and SG1 can be transmitted, and the third candidate starting position (symbol 7) is determined based on the assumption that symbol group SG0 can be transmitted.

Referring to FIG. 8, including the first symbol for AGC tuning, a UE may prepare a single PSCCH/PSSCH with 14 symbols without the last gap symbol. In the case that a channel access procedure for the first candidate starting position (symbol 0) of slot n succeeds, all 14 prepared symbols are transmitted from symbol 0 to symbol 13 on practical symbols of the slot, as shown at 810 in FIG. 8. Otherwise, in the case that the channel access procedure for symbol 0 fails, the UE may perform a channel access procedure for the second candidate starting position (symbol 3) of slot n.

In the case that the channel access procedure for symbol 3 succeeds, since there are a total of 11 symbols (from symbol 3 to symbol 13) available in the slot, the first 11 symbols of the 14 prepared symbols are transmitted from symbol 3 to symbol 13 on the practical symbols of the slot, as shown at 820 in FIG. 8. Otherwise, in the case that the channel access procedure for symbol 3 fails, the UE may perform a channel access procedure for the third candidate starting position (symbol 7) of slot n.

In the case that the channel access procedure for symbol 7 succeeds, since there are a total of 7 symbols (from symbol 7 to symbol 13) available in the slot, the first 7 symbols of the 14 prepared symbols are transmitted from symbol 7 to symbol 13 on the practical symbols of the slot, as shown at 830 in FIG. 8. In the case that the channel access procedure for symbol 7 fails, the UE may perform a channel access procedure for the first candidate starting position (symbol 0) in the next slot (slot n+1).

Figure 9:
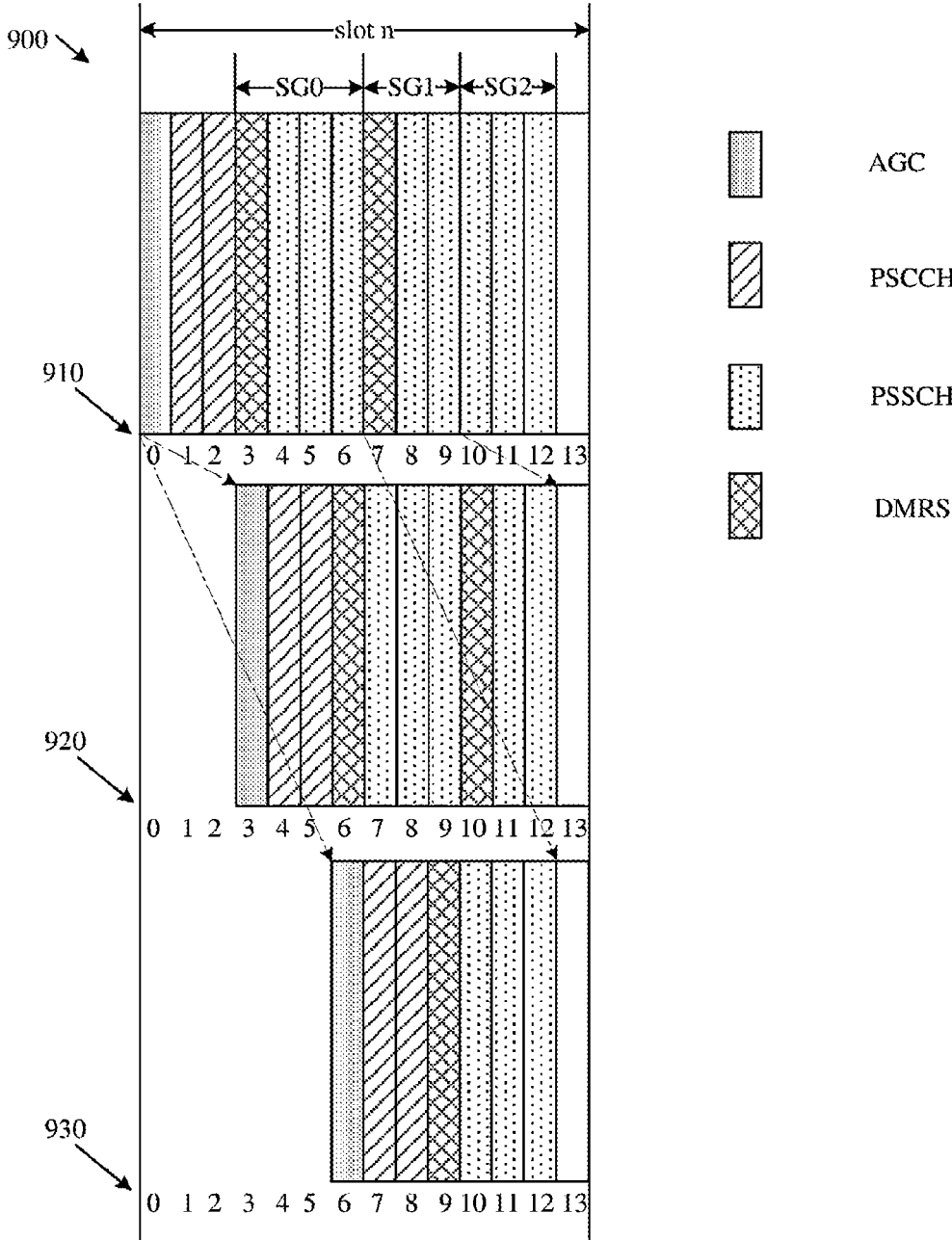
FIG. 9 illustrates an exemplary sidelink transmission in accordance with some embodiments of the present disclosure.

FIG. 9 illustrates an exemplary sidelink transmission 900 in accordance with some embodiments of the present disclosure. Details described in all of the foregoing embodiments of the present disclosure are applicable for the embodiments shown in FIG. 9.

In some embodiments of the present disclosure, the structure of the symbol groups in a slot may be configured or predefined as the one described with respect to FIG. 5. Specifically, referring to FIG. 9, the first symbol group SG0 may include symbols 3-6, the second symbol group SG1 may include symbols 7-9, and the third symbol group SG2 may include symbols 10-12.

The candidate starting positions may be determined based on the structure of the symbol groups. For example, the number of the candidate starting positions may be equal to the number of symbol groups in a slot. Based on the above symbol group structure, a UE may determine that the set of candidate starting positions is {0, 3, 6}. That is, the first candidate starting position (symbol 0) is determined based on the assumption that all symbol groups can be transmitted, the second candidate starting position (symbol 3) is determined based on the assumption that symbol groups SG0 and SG1 can be transmitted, and the third candidate starting position (symbol 6) is determined based on the assumption that symbol group SG0 can be transmitted.

Referring to FIG. 9, including the first symbol for AGC tuning, a UE may prepare a single PSCCH/PSSCH with 13 symbols with the last gap symbol (symbol 13). In the case that a channel access procedure for the first candidate starting position (symbol 0) of slot n succeeds, all 13 prepared symbols are transmitted from symbol 0 to symbol 12 on the practical symbols of the slot, as shown at 910 in FIG. 9. Otherwise, in the case that the channel access procedure for symbol 0 fails, the UE may perform a channel access procedure for the second candidate starting position (symbol 3) of slot n.

In the case that the channel access procedure for symbol 3 succeeds, since there are a total of 10 symbols (from symbol 3 to symbol 12) available in the slot, the first 10 symbols of the 13 prepared symbols are transmitted from symbol 3 to symbol 12 on the practical symbols of the slot, as shown at 920 in FIG. 9. Otherwise, in the case that the channel access procedure for symbol 3 fails, the UE may perform a channel access procedure for the third candidate starting position (symbol 6) of slot n.

In the case that the channel access procedure for symbol 6 succeeds, since there are a total of 7 symbols (from symbol 6 to symbol 12) available in the slot, the first 7 symbols of the 13 prepared symbols are transmitted from symbol 6 to symbol 12 on the practical symbols of the slot, as shown at 930 in FIG. 9. In the case that the channel access procedure for symbol 6 fails, the UE may perform a channel access procedure for the first candidate starting position (symbol 0) in the next slot (slot n+1).

Although the above embodiments described that a set of candidate starting positions may be determined based on the configured or predefined symbol group structure, it is contemplated that the set of candidate starting positions may also be configured by RRC signaling or predefined, for example, in standards. In other words, either the set of candidate starting positions or the symbol group structure may be configured by RRC signaling or predefined.

In some embodiments of the present disclosure, the structure of the symbol groups may be determined based on a configured or predefined set of candidate starting positions (e.g., $C_0$, $C_1$, . . . , $C_m$). For example, a UE may determine that the number of symbol groups in a slot is equal to the number of the candidate starting positions. Then, the UE may further determine the number of symbols (e.g., $N_0$, $N_1$, $N_m$) in these symbol groups.

For example, considering that the first symbol (e.g., symbol 0) in a slot may be used for AGC tuning, the UE may determine that the first symbol group (SG0) includes $N_0$ symbols, wherein $N_0 = (14 - y - k - p) - C_m$, 14 is the number of symbols in a slot, y=1 when the last symbol (symbol 13) in the slot is left as a gap and y=0 when the last symbol in the slot is available for transmission, k is the number of symbols for AGC tuning and may be equal to 1, p is the number of symbols only for a PSCCH transmission (e.g., symbols 1 and 2 in FIGS. 4 and 5), and $C_m$ is the last candidate starting position.

The UE may determine that the second symbol group (SG1) includes $N_1$ symbols, wherein $N_1 = (14 - y - k - p) - C_{m\_i} - N_0$, 14 is the number of symbols in a slot, y=1 when the last symbol (symbol 13) in the slot is left as a gap and y=0 when the last symbol in the slot is available for transmission, k is the number of symbols for AGC tuning and may be equal to 1, p is the number of symbols only for a PSCCH transmission, and $C_{m\_i}$ is the second to the last candidate starting position.

Similarly, the UE may determine that the last symbol group (SGm) includes $N_m$ symbols, wherein $N_m = (14 - y - k - p) - C_0 - (N_0 + N_1 + . . . N_{m-1})$, 14 is the number of symbols in a slot, y=1 when the last symbol (symbol 13) in the slot is left as a gap and y=0 when the last symbol in the slot is available for transmission, k is the number of symbols for AGC tuning and may be equal to 1, p is the number of symbols only for a PSCCH transmission, and $C_0$ is the first candidate starting position.

For example, assuming that a set of candidate starting positions may be configured or predefined as {0, 3, 6, 9}, a UE may determine that the number of symbol groups in a slot is 4. Assuming that there is no gap symbol and the PSCCH and the associated PSSCH are multiplexed based on both TDM and FDM (e.g., p=0), the UE may further determine that the first symbol group (SG0) includes 4 symbols. Since the first symbol (e.g., symbol 0) is used for AGC tuning, the UE may further determine that the first symbol group includes symbols 1-4. The UE may determine that the second symbol group includes 3 symbols, i.e., symbols 5-7. The UE may determine that the third symbol group includes 3 symbols, i.e., symbols 8-10. The UE may determine that the fourth symbol group includes 3 symbols, i.e., symbols 11-13.

In another example, assuming that a set of candidate starting positions may be configured or predefined as {0, 3, 7}, a UE may determine that the number of symbol groups in a slot is 3. Assuming that there is no gap symbol and the PSCCH and the associated PSSCH are multiplexed based on TDM (e.g., p=2), the UE may further determine that the first symbol group (SG0) includes 4 symbols. Since the first symbol (e.g., symbol 0) is used for AGC tuning and the second and third symbols (e.g., symbols 1 and 2) are used for PSCCH transmission only, the UE may further determine that the first symbol group includes symbols 3-6. The UE may determine that the second symbol group includes 4 symbols, i.e., symbols 7-10. The UE may determine that the third symbol group includes 3 symbols, i.e., symbols 11-13.

Within each symbol group in a slot, for a transport block (TB) to be carried in the slot, several manners may be adopted for PSSCH rate matching in the slot.

For example, in some embodiments of the present disclosure, an integer number of code blocks (CBs) of a TB may be included with rate matching independently performed in each symbol group. In this case, each and every CB does not traverse a symbol group. Symbol group-based retransmission may thus be required. In the case that a physical sidelink feedback channel (PSFCH) is disabled, a UE (e.g., Tx UE) may retransmit the CBs included in the punctured symbol group(s). In the case that the PSFCH is enabled, the number of HARQ-ACK feedback bits for the slot is equal to the number of symbol groups and each of the HARQ-ACK feedback bits corresponds to a respective one of the symbol groups. In response to the reception of symbol group-based HARQ-ACK feedback, the UE may retransmit the CBs included in the symbol group(s) which is associated with a negative acknowledgement (NACK), as indicated by another UE (e.g., Rx UE).

In some other embodiments of the present disclosure, an integer number of code block groups (CBGs) of a TB may be included with rate matching independently performed in each symbol group. In this case, each and every CBG does not traverse a symbol group. CBG-based retransmission may thus be required. In the case that the PSFCH is disabled, a UE (e.g., Tx UE) may retransmit the CBGs included in the punctured symbol group(s). In the case that the PSFCH is enabled, the number of HARQ-ACK feedback bits for the slot is equal to the number of CBGs per TB and each of the HARQ-ACK feedback bits corresponds to a respective one of the CBGs. In response to reception of CBG-based HARQ-ACK feedback, the UE may retransmit the CBG(s) which is associated with a NACK, as indicated by another UE (e.g., Rx UE).

In yet other embodiments of the present disclosure, multiple redundancy versions (RVs) of a TB may be carried on the one or more symbol groups. That is, each symbol group may be used to transmit a respective RV of the TB. For example, when there are four symbol groups (e.g., SG0, SG1, SG2 and SG3) in a slot, the four symbol groups can be used to transmit RV0, RV2, RV3 and RV1 of the TB, respectively. RV0 is a repetition of the TB with the most systematic bits. When there are three symbol groups in a slot, e.g., SG0, SG1, and SG2, the three symbol groups can be used to transmit RV0, RV2, and RV3 of the TB, respectively. In these embodiments, since multiple RVs of a TB are transmitted, reliability is relatively high. Even if the PSFCH is disabled, the possibility of the retransmission of the whole TB is very low. When the PSFCH is enabled, a single HARQ-ACK feedback bit corresponding to the TB is required.

In some embodiments of the present disclosure, to further reduce the implementation complexity of a UE and the overhead of CBG-based or symbol group-based HARQ-ACK feedback, only the sidelink transmission in the initial slot is divided into one or more symbol groups as described above and is fed back with CBG-based or symbol group-based HARQ-ACK feedback bits. This is because the channel access procedure for the initial slot (e.g., slot j) is unpredictable and is not required for the remaining slot(s) (e.g., slot j+1) within the COT. That is, after a successful channel access procedure in an initial slot, a UE (e.g., Tx UE) may occupy the channel a certain COT. Sidelink transmission in the remaining slot(s) (e.g., slot j+1) of a Tx UE-initiated COT is always transmitted from the first symbol (e.g., symbol 0) of a slot. In this scenario, there may be no need to apply the symbol group mechanism to the remaining slot(s). Meanwhile, only TB-based HARQ-ACK feedback may be applied for the remaining slot(s). In this way, the implementation complexity of a UE and the feedback overhead can be greatly improved.

Figure 10:
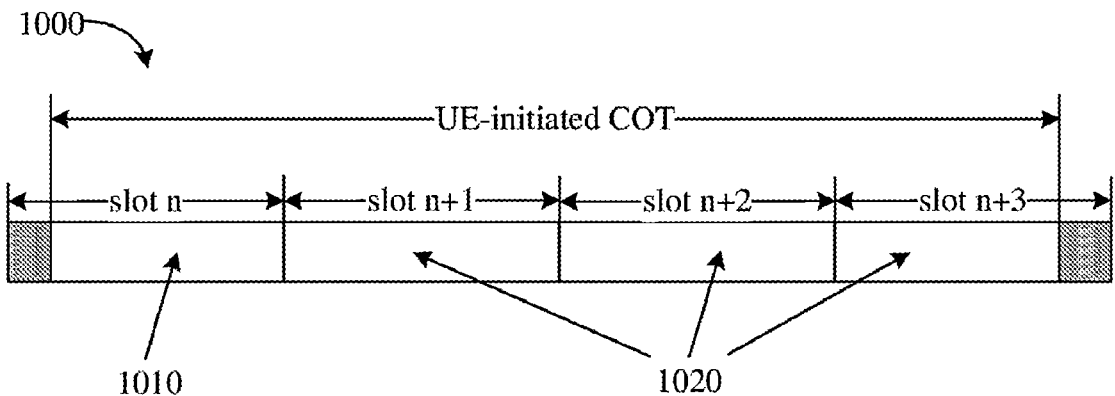
FIG. 10 illustrates an exemplary UE-initiated COT in accordance with some embodiments of the present disclosure.

FIG. 10 illustrates an exemplary UE-initiated COT 1000 in accordance with some embodiments of the present disclosure. Details described in all of the foregoing embodiments of the present disclosure are applicable for the embodiments shown in FIG. 10.

A UE (e.g., Tx UE) may initiate the COT 1000 for transmitting data after successfully performing a channel access procedure. The COT 500 may start at slot n and end at slot n+3. As shown in FIG. 10, the initial slot (slot n) is not fully included in the COT 1000. The last slot (slot n+3) is also not fully included in the COT 1000. In some other embodiments of the present disclosure, the initial slot and the last slot may be fully included in the COT 1000.

The UE may transmit sidelink transmission 1010 and sidelink transmission 1020 within the COT 1000. Each of the sidelink transmission 501 and sidelink transmission 502 may include a corresponding PSCCH and the associated PSSCH. The sidelink transmission 1010 in the initial slot (slot n) is divided into one or more symbol groups as described above, and the sidelink transmission 1020 is transmitted on a slot basis (e.g., starting from symbol 0 of the corresponding slots). Moreover, in the case that CBG-based or symbol group-based HARQ-ACK feedback is adopted, the sidelink transmission 1010 is fed back with one or more HARQ-ACK feedback bits corresponding to the CBGs or symbol groups. The sidelink transmission 1020 is fed back per TB (i.e., TB-based HARQ-ACK feedback).

Figure 11:
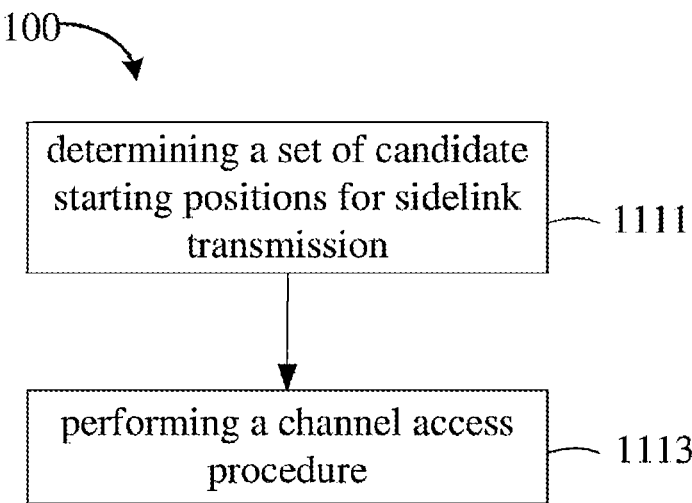
FIG. 11 illustrates a flow chart of an exemplary procedure of wireless communications in accordance with some embodiments of the present disclosure.

FIG. 11 illustrates a flow chart of an exemplary procedure 1100 of wireless communications in accordance with some embodiments of the present disclosure. Details described in all of the foregoing embodiments of the present disclosure are applicable for the embodiments shown in FIG. 11. The procedure may be performed by a UE, for example, UE 110a, UE 110b, or UE 110c in FIG. 1.

Referring to FIG. 11, in operation 1111, a UE may determine a set of candidate starting positions for sidelink transmission (e.g., {0, 3, 6, 9}). In some examples, the set of candidate starting positions may be configured by radio resource control (RRC) signaling or predefined. In some other examples, the set of candidate starting positions may be determined based on one or more symbol groups. In some embodiments, the number of candidate starting positions in the set of candidate starting positions may be equal to the number of symbol groups of the one or more symbol groups.

In operation 1113, the UE may perform a channel access procedure based on the set of candidate starting positions. For example, the UE may perform a channel access procedure (hereinafter, "the first channel access procedure") for one candidate starting position (hereinafter, "the first candidate starting position") of the set of candidate starting positions in a slot (hereinafter, "the first slot"). The first candidate starting position may be the one with the lowest symbol index such as symbol 0. In response to channel access procedures for all candidate starting positions (e.g., symbols 0, 3, 6, and 9) of the set of candidate starting positions in the first slot being failed, another channel access procedure is performed for the first candidate starting position in another slot following the first slot.

In some embodiments of the present disclosure, the UE may generate a PSCCH (hereinafter, "the first PSCCH") and a PSSCH (hereinafter, "the PSSCH"), wherein the first PSSCH is scheduled by the first PSCCH for transmitting a transport block (TB). In response to the first channel access procedure being successful, the UE may transmit the first PSCCH and the first PSSCH from the first candidate starting position in the first slot.

In some embodiments of the present disclosure, the first slot may be divided into one or more symbol groups, for example, as described above with respect to FIGS. 2-10. In some examples, the one or more symbol groups may be configured by RRC signaling or predefined. In some other examples, the one or more symbol groups may be determined based on the set of candidate starting positions. In some embodiments, the number of candidate starting positions in the set of candidate starting positions may be equal to the number of symbol groups of the one or more symbol groups.

In some embodiments of the present disclosure, each symbol group of the one or more symbol groups may include an integer number of CBs of the TB. In other words, each and every CB does not traverse a symbol group. In this scenario, the UE may receive respective HARQ-ACK feedback corresponding to each of the one or more symbol groups. In response to the HARQ-ACK feedback for a symbol group of the first PSSCH being a NACK, the UE may transmit (or retransmit) the symbol group of the first PSSCH.

In some embodiments of the present disclosure, each symbol group may include an integer number of CBGs of the TB. In other words, each and every CBG does not traverse a symbol group. In this scenario, the UE may receive respective HARQ-ACK feedback corresponding to each of the CBGs. In response to the HARQ-ACK feedback for a CBG being a NACK, the UE may transmit (or retransmit) the CBG.

In some embodiments of the present disclosure, each symbol group may include a RV of the TB. In this scenario, the UE may transmit one or more RVs of the TB on the one or more symbol groups. In response to the HARQ-ACK feedback for the TB being a NACK, the UE may transmit (or retransmit) the TB.

In some embodiments of the present disclosure, the first PSSCH may be transmitted on available symbols in the first slot. When the number of symbols of the first PSSCH is greater than the number of the available symbols in the first slot, the first PSSCH may be punctured to align with the number of the available symbols in the first slot. In some examples, the last one or more symbols of the first PSSCH may be punctured. In some examples, the last one or more symbol groups of the first PSSCH may be punctured.

In some embodiments of the present disclosure, in response to the first PSSCH being transmitted in the first slot, the UE may further transmit another PSSCH (hereinafter, "the second PSSCH") in another slot following the first slot. The UE may receive symbol group-based HARQ-ACK feedback or CBG-based HARQ-ACK feedback for the first PSSCH and receive TB-based HARQ-ACK feedback for the second PSSCH.

It should be appreciated by persons skilled in the art that the sequence of the operations in exemplary procedure 1100 may be changed and some of the operations in exemplary procedure 1100 may be eliminated or modified, without departing from the spirit and scope of the disclosure.

Figure 12:
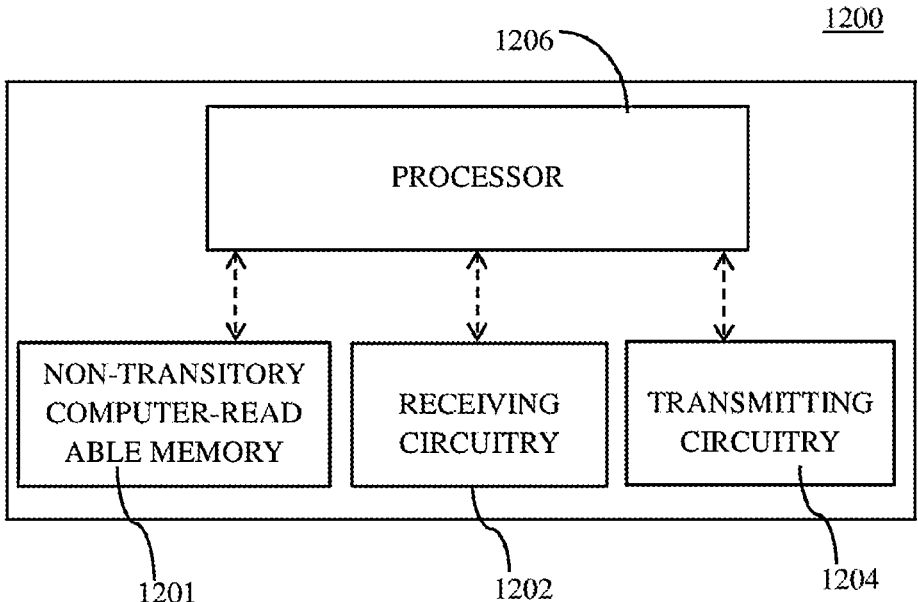
FIG. 12 illustrates a block diagram of an exemplary apparatus in accordance with some embodiments of the present disclosure.

FIG. 12 illustrates a block diagram of an exemplary apparatus 1200 in accordance with some embodiments of the present disclosure.

As shown in FIG. 12, the apparatus 1200 may include at least one non-transitory computer-readable medium 1201, at least one receiving circuitry 1202, at least one transmitting circuitry 1204, and at least one processor 1206 coupled to the non-transitory computer-readable medium 1201, the receiving circuitry 1202 and the transmitting circuitry 1204. The apparatus 1200 may be a base station side apparatus (e.g., a BS) or a communication device (e.g., a UE).

Although in this figure, elements such as the at least one processor 1206, transmitting circuitry 1204, and receiving circuitry 1202 are described in the singular, the plural is contemplated unless a limitation to the singular is explicitly stated. In some embodiments of the present application, the receiving circuitry 1202 and the transmitting circuitry 1204 are combined into a single device, such as a transceiver. In certain embodiments of the present application, the apparatus 1200 may further include an input device, a memory, and/or other components.

In some embodiments of the present disclosure, the non-transitory computer-readable medium 1201 may have stored thereon computer-executable instructions to cause a processor to implement the method with respect to the UEs as described above. For example, the computer-executable instructions, when executed, cause the processor 1206 interacting with receiving circuitry 1202 and transmitting circuitry 1204, so as to perform the operations with respect to the UEs described in FIGS. 1-10.

In some embodiments of the present disclosure, the non-transitory computer-readable medium 1201 may have stored thereon computer-executable instructions to cause a processor to implement the method with respect to the BSs as described above. For example, the computer-executable instructions, when executed, cause the processor 1206 interacting with receiving circuitry 1202 and transmitting circuitry 1204, so as to perform the operations with respect to the BSs described in FIGS. 1-9. In some examples, the BS may transmit a RRC message to a UE to configure at least one of a structure of symbol groups and a set of candidate starting positions.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements which does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including." The wording of "the first" and "the second" is only used to clearly illustrate the embodiments of the present application, but not used to limit the substance of the present application.

What is claimed:

1. A method performed by a user equipment (UE), the method comprising:

determining a plurality of candidate starting positions for sidelink transmission in a first slot, each candidate starting position of the plurality of candidate starting positions indicating a different symbol within the first slot;

performing, prior to a first candidate starting position of the plurality of candidate starting positions, a first channel access procedure for the first candidate starting position; and in response to the first channel access procedure failing, transmitting a first physical sidelink control channel (PSCCH) or a first physical sidelink shared channel (PSSCH) from a second candidate starting position of the plurality of candidate starting positions in the first slot, wherein the second candidate starting position indicates a symbol that is later than a symbol indicated by the first candidate starting position within the first slot.

2. A user equipment (UE) for wireless communication, comprising:

at least one memory; and at least one processor coupled with the at least one memory and configured to cause the UE to:

determine a plurality of candidate starting positions for sidelink transmission in a first slot, each candidate starting position of the plurality of candidate starting positions indicating a different symbol within the first slot;

perform, prior to a first candidate starting position of the plurality of candidate starting positions, a first channel access procedure for the first candidate starting position; and in response to the first channel access procedure failing, transmit a first physical sidelink control channel (PSCCH) or a first physical sidelink shared channel (PSSCH) from a second candidate starting position of the plurality of candidate starting positions in the first slot, wherein the second candidate starting position indicates a symbol that is later than a symbol indicated by the first candidate starting position within the first slot.

3. The UE of claim 2, wherein the at least one processor is further configured to cause the UE to:

generate the first PSCCH and the first PSSCH, wherein the first PSSCH is scheduled by the first PSCCH for transmitting a transport block (TB).

4. The UE of claim 3, wherein the first PSSCH is divided into one or more symbol groups that are configured by radio resource control (RRC) signaling, predefined in standards, or determined based on the plurality of candidate starting positions.

5. The UE of claim 4, wherein each symbol group of the one or more symbol groups includes an integer number of code blocks (CBs) of the TB.

6. The UE of claim 5, wherein the at least one processor is further configured to cause the UE to:

receive respective hybrid automatic repeat request acknowledgement (HARQ-ACK) feedback corresponding to each of the one or more symbol groups.

7. The UE of claim 4, wherein each symbol group of the one or more symbol groups includes an integer number of code block groups (CBGs) of the TB.

8. The UE of claim 7, wherein the at least one processor is further configured to cause the UE to:

receive respective hybrid automatic repeat request acknowledgement (HARQ-ACK) feedback corresponding to each of the CBGs.

9. The UE of claim 8, wherein the at least one processor is further configured to cause the UE to:

transmit a CBG in response to the respective HARQ-ACK feedback for the CBG being a negative acknowledgement (NACK).

10. The UE of claim 4, wherein each symbol group of the one or more symbol groups includes a redundancy version (RV) of the TB.

11. The UE of claim 10, wherein the at least one processor is further configured to cause the UE to:

transmit a plurality of RVs of the TB on the one or more symbol groups.

12. The UE of claim 2, wherein the plurality of candidate starting positions is configured by radio resource control (RRC) signaling or is predefined.

13. The UE of claim 2, wherein the plurality of candidate starting positions is determined based on one or more symbol groups, and the one or more symbol groups is configured by radio resource control (RRC) signaling or is predefined.

14. The UE of claim 13, wherein a quantity of candidate starting positions in the plurality of candidate starting positions is equal to a quantity of symbol groups of the one or more symbol groups.

15. The UE of claim 2, wherein the first PSSCH is transmitted on available symbols in the first slot.

16. The UE of claim 15, wherein the first PSSCH is punctured when a quantity of symbols of the first PSSCH is greater than a quantity of the available symbols in the first slot.

17. The UE of claim 16, wherein a last one or more symbols of the first PSSCH are punctured.

18. The UE of claim 2, wherein the at least one processor is further configured to cause the UE to:

transmit a second PSSCH in a second slot following the first slot in response to the first PSSCH being transmitted in the first slot.

19. The UE of claim 18, wherein the at least one processor is further configured to cause the UE to:

receive symbol group-based hybrid automatic repeat request acknowledgement (HARQ-ACK) feedback or code block groups (CBG) based HARQ-ACK feedback for the first PSSCH; and receive transport block (TB)-based HARQ-ACK feedback for the second PSSCH.

20. A processor for wireless communication, comprising:

at least one controller coupled with at least one memory and configured to cause the processor to:

determine a plurality of candidate starting positions for sidelink transmission in a first slot, each candidate starting position of the plurality of candidate starting positions indicating a different symbol within the first slot;

perform, prior to a first candidate starting position of the plurality of candidate starting positions, a first channel access procedure for the first candidate starting position; and in response to the first channel access procedure failing, transmit a first physical sidelink control channel (PSCCH) or a first physical sidelink shared channel (PSSCH) from a second candidate starting position of the plurality of candidate starting positions in the first slot, wherein the second candidate starting position indicates a symbol that is later than a symbol indicated by the first candidate starting position within the first slot.

\* \* \* \* \*